United States Patent [19]

Rose

[11] Patent Number: 4,561,247
[45] Date of Patent: Dec. 31, 1985

[54] HYDRODYNAMIC TRANSMISSION REVERSAL CONTROL

[75] Inventor: Gene R. Rose, Buchanan, Mich.

[73] Assignee: Clark Michigan Company, Buchanan, Mich.

[21] Appl. No.: 581,634

[22] Filed: Feb. 21, 1984

[51] Int. Cl.$^4$ .............................................. F16D 33/00
[52] U.S. Cl. .......................................... 60/335; 60/363
[58] Field of Search .................... 60/335, 363; 74/858, 74/730

[56] References Cited

U.S. PATENT DOCUMENTS

| | | | |
|---|---|---|---|
| 3,566,715 | 3/1971 | Keller et al. | 74/731 |
| 4,099,426 | 7/1978 | Keller et al. | 74/730 |
| 4,184,330 | 1/1980 | Polzer et al. | 60/335 |
| 4,223,573 | 9/1980 | Franssen | 74/858 |

Primary Examiner—Edward K. Look
Attorney, Agent, or Firm—Kenneth C. Witt; John C. Wiessler

[57] ABSTRACT

A control system for a drive apparatus which includes an engine and a hydrodynamic transmission with the latter including a forward hydraulic torque converter, a reverse hydraulic torque converter, and means for selectively filling either of the torque converters with hydraulic fluid to provide operation of the drive apparatus in the desired direction. A pedal or other operator control member is provided which when operated first causes the engine speed to drop to an idling speed, while further movement of the operator control member causes the engine speed to increase and the previously inactive torque converter to fill at a rate corresponding to the movement of the pedal.

15 Claims, 6 Drawing Figures

HYDRODYNAMIC TRANSMISSION REVERSAL CONTROL

BACKGROUND OF THE INVENTION

1. Field of the Invention

This invention relates to controls for transmissions of the type which employ drain and fill type torque converters instead of change speed gears or other mechanical means to operate a vehicle in forward and reverse and to meet other operating requirements.

2. Description of the Prior Art

U.S. Pat. No. 3,566,715 Keller et al., U.S. Pat. No. 4,099,426 Keller et al., and U.S. Pat. No. 4,184,330 Polzer et al. show hydrodynamic transmissions of the type with which this invention is used.

SUMMARY OF THE INVENTION

The present invention comprises a control system for a drive apparatus which includes an engine and a hydrodynamic transmission; the latter includes a forward hydraulic torque converter, a reverse hydraulic torque converter, and means for selectively filling either one of the torque converters with hydraulic fluid while draining the other to provide reversal of the drive apparatus while the engine operates continuously at a selected operating speed. This invention provides an alternate means for reversing the drive apparatus including a pedal or other operator control member. Initial movement of the pedal causes the engine speed to drop to a low or idling speed. Further movement thereof causes the engine speed to increase and the previously inactive torque converter to fill at a rate responsive to the extent of movement of the pedal, producing an operator controlled retarding action by the transmission on the vehicle.

DESCRIPTION OF THE PREFERRED EMBODIMENT

Figure 4:
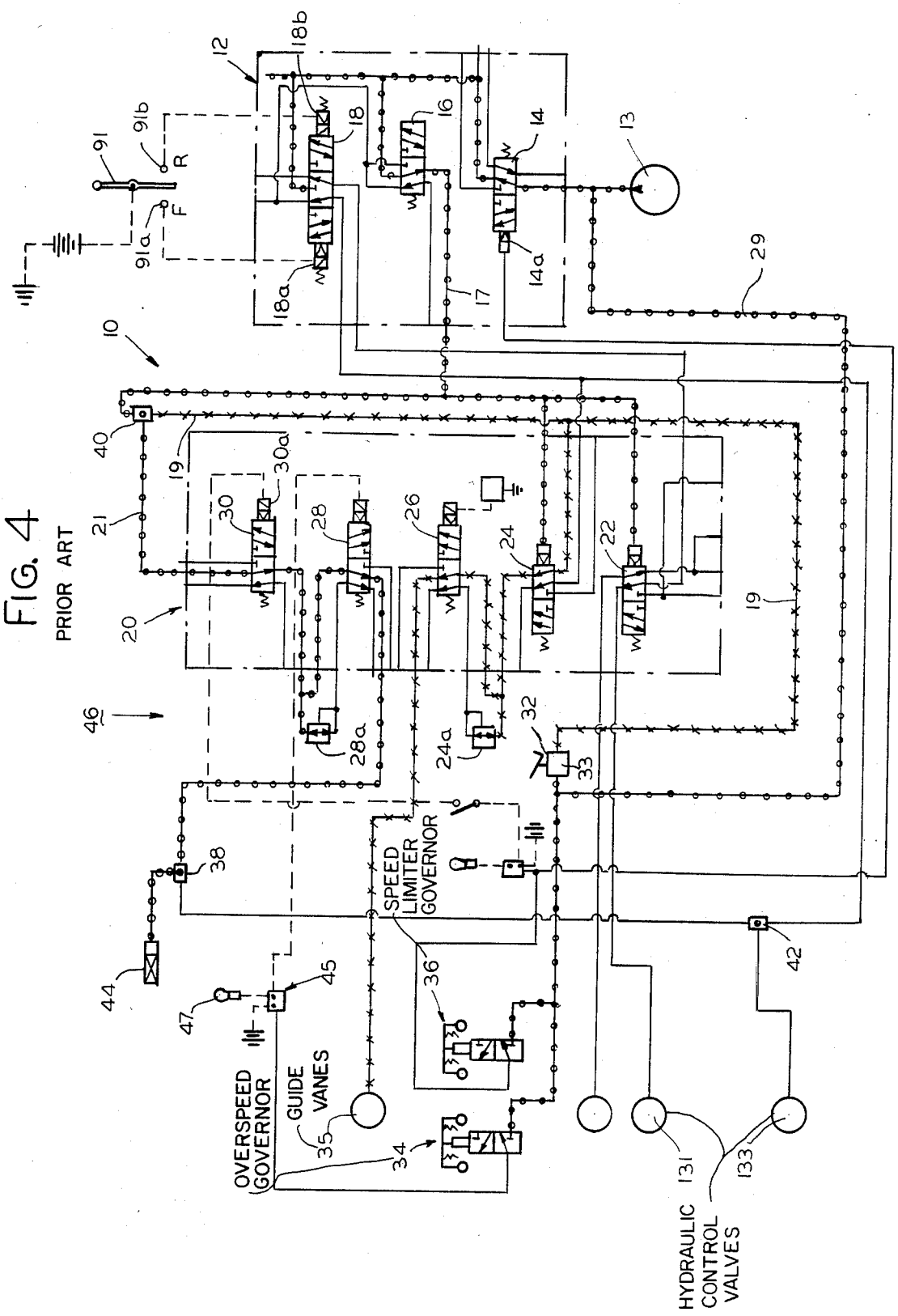
FIG. 4 shows a prior art control system with the transmission in a neutral mode.

Referring first to FIG. 4 of the drawing, there is shown a prior art control system 10 for a hydrodynamic transmission, which transmission is similar to that of U.S. Pat. No. 4,099,426 except that the hydrodynamic brake 61 is not present. Further the prior control system 10 illustrated provides for the operation of a forward torque converter (No. 41 of said patent), and reverse torque converter (No. 31 of said patent), but not for the cruising torque converter (No. 51 of said patent). The prior system of FIG. 4 is indicated generally by the numeral 10. The system 10 is pneumatic with electrical pilot devices, and includes a valve bank 12 having three valves 14, 16 and 18. A compressor 13 supplies pressurized air to valve bank 12 and to other parts of the system as described herein. Valve 14 is an overspeed valve which is not affected by the present invention. This valve controls the flow of air to the other two valves in bank 12. The spool of valve 14 has two positions. In the normal position, shown in FIG. 4, the spool is held by a spring and air flows through valve 14 to the other two valves in bank 12. The spool of valve 14 is held in the same position in the other two modes illustrated and described herein.

Valve 16 is a range selector valve which has two positions and which is not affected by this invention. The direction selector valve 18 has three positions and is spring centered. When the operator's control lever 91 or other equivalent control member is in the neutral position, the springs hold the spool in the neutral (center) position shown in FIG. 4. In this position there is no flow of pressurized air through the valve 18 and both the forward and reverse ports are vented to atmosphere. When the operator moves the control member 91 to forward, an electric switch 91,91a activates solenoid 18a of the valve 18; the compressed air pushes the valve spool to the forward position shown in FIG. 5. When it is desired to shift valve 18 to the reverse position shown in FIG. 6 the other solenoid 18b is activated by the closing of switch 91,91b.

Figure 5:
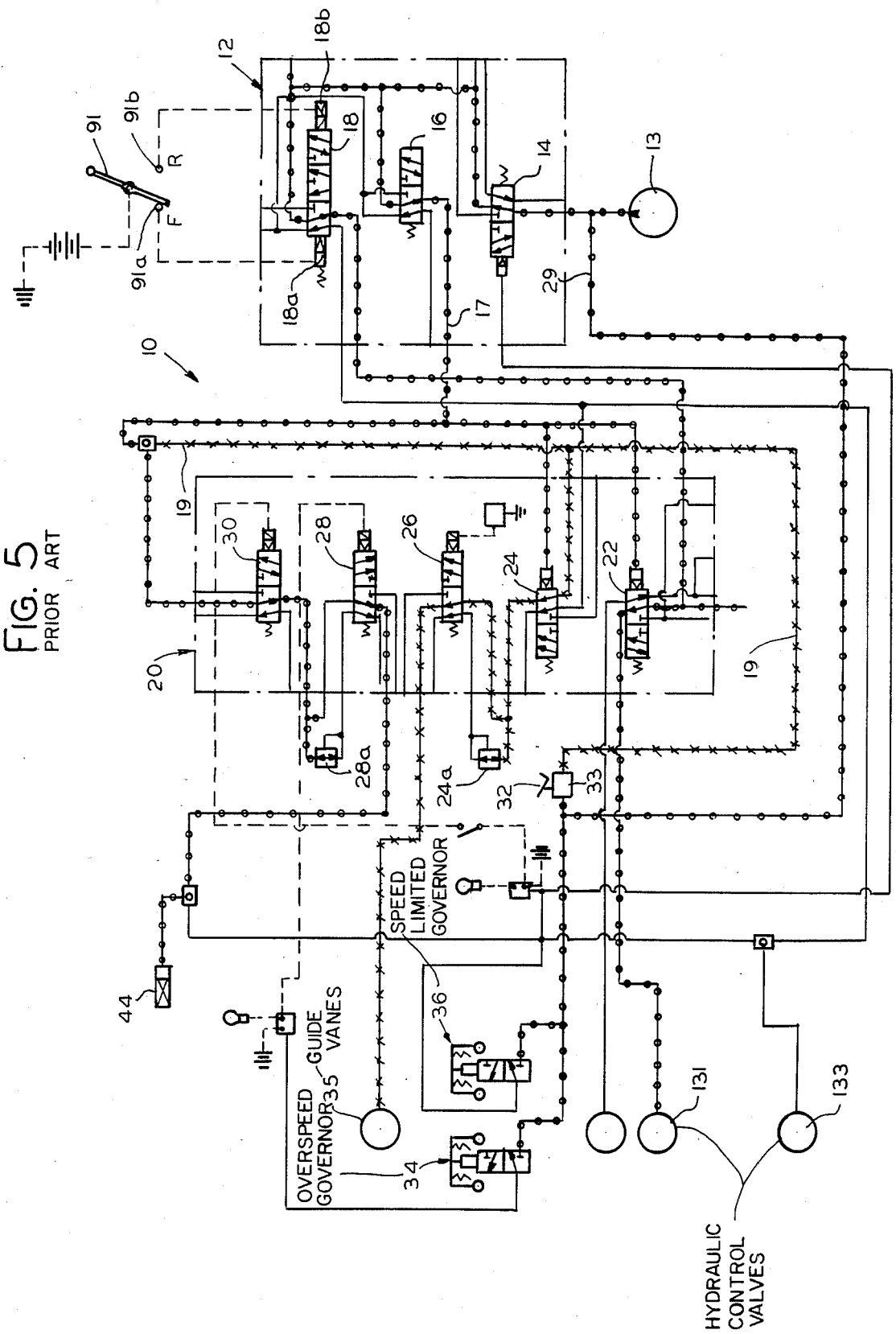
FIG. 5 shows the prior art system with the transmission in a forward mode.
Figure 6:
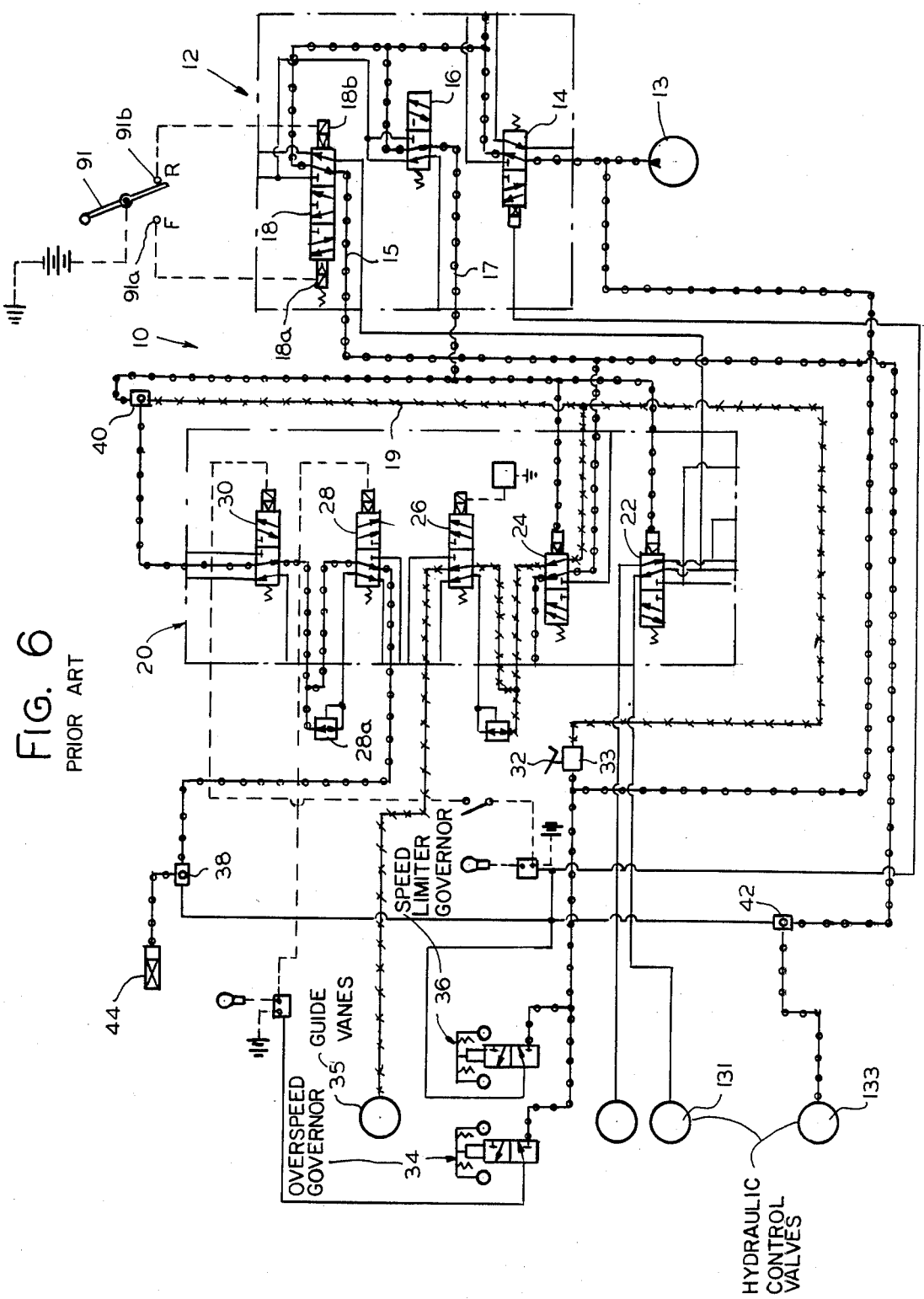
FIG. 6 shows the prior art system with the transmission in a reverse mode.

The initiate operation of a vehicle equipped with the prior art controls of FIGS. 4–6, after the engine has been started, the manually controlled direction selector control member 91 at the operator's station is moved to forward or reverse by the operator, putting the transmission in either the forward mode or reverse mode shown in FIGS. 5 and 6 respectively. The vehicle when moves in the selected direction at a speed which is controlled by a foot pedal 32 which operates guide vanes 35 which are present in both torque converters. When the guide vanes are closed the respective torque converter produces a minimum of output torque; when they are open the guide vanes produce a maximum amount of output torque by the drive apparatus. In between the torque varies with the position of the guide vanes. As explained later the use of the present invention causes the guide vanes to act differently from the prior art.

Number 36 indicates a speed limiter governor. When the speed of the transmission output shaft reaches the setting of the governor, the governor 36 opens. In the position illustrated the vent is closed and air flows through the governor from inlet to outlet. Number 34 denotes an overspeed governor which operates the same as the speed limiter governor 36 except that the speed setting is higher. These two governors are not affected by the present invention.

There are three check valves numbered 38, 40 and 42 respectively. All of them are two-way check valves with an inlet on each end and an outlet in the side. The air pressure in one inlet is higher than that in the other inlet. The higher air pressure moves the shuttle or ball check against the lower air pressure. This closes the inlet port which has the lower pressure applied and opens the other port. This lets the higher pressure air flow through the check valve and blocks the lower pressure air.

A valve bank 20 is made up of five individual valves 22, 24, 26, 28 and 30. The spool in each valve has two positions. The spools are held in one position by spring tension and in the other position by air pressure. The spools in the converter fill valve 22 and the guide vane angle relay valve 24 are moved by air from conduit 17. The spools in the other three valves are moved by air from inside each section, being controlled by solenoids on the respective valves.

One of the valves in valve bank 20 is the converter fill valve 22. In one of its two positions this valve sends pressurized air to the transmission's hydraulic control valve 131, filling the forward torque converter, providing the other parts of the system are as shown in FIG. 5. In FIGS. 4 and 6 valve 22 is ineffective. The other position of valve 22 is not relevant to the present invention.

Number 24 denotes the converter guide vane angle valve for operating the guide vanes 35 through an intervening servo motor. This valve directs air to the draw bar reduction valve 26. In the position illustrated in FIGS. 4, 5 and 6, air, from the compressor 13 through conduit 29, flows through the regulator valve 24. Regulated air, at a pressure less than the system pressure, from the valve 33, flows through the valve 24 and regulator relay valve 24a. Number 26, the draw bar reduction valve, sends air to the servo motor in the transmission which operates guide vanes 35 to adjust the output torque of the transmission.

The maximum engine speed reduction valve is indicated at 28. This valve directs air to the slave cylinder 44 which operates the throttle on the engine. In one position, air, from the idle speed relay valve 30, flows through the valve 28 to slave cylinder 44. In the other position, air, from the maximum engine speed reduction regulator relay valve 28a, flows through the valve 28 to slave cylinder 44.

Number 30 indicates the idle speed relay valve. This valve directs air to the maximum engine speed reduction valve 28. In the positions illustrated in FIGS. 4, 5 and 6, air, from the range selector valve 16 flows through the valve 30. In the other position, the flow of air is blocked and the outlet port of the valve 30 is open to the atmosphere.

The slave cylinder 44 operates the throttle (not shown) on the engine. There is spring tension against one end of the piston in the slave cylinder. As air pressure against the other end of the piston increases, the piston moves. The higher the air pressure the more the piston moves.

The control system illustrated in FIG. 4 of the drawing is indicated generally by the numeral 10 and shows such system in a neutral mode. The conduits which are pressurized in this mode at supply pressure, from compressor 13, are indicated on the drawing by small circles along the conduits which are thus pressurized. Air from the valve 14 flows through the range selector valve 16 and into conduit 17. Air from conduit 17 flows to check valve 40 and pushes the shuttle or ball check to the other end of the check valve. Air then flows out of the check valve 40 to the idle speed relay valve 30. The spool in the valve 30 is held in position by spring tension. Air flows through the idle speed relay valve 30 to the maximum engine speed reduction valve 28. The spool in the valve 28 is held in position by spring tension. In this position, the regulated air pressure in conduit 19, which is regulated by valve 33, is blocked and the system air pressure of conduit 17 flows through the valve 28. Thus system air pressure flows to the check valve 38, moves the shuttle therein and flows through valve 38 to the slave cylinder 44 of the engine throttle. This causes the engine to run at normal operating speed.

The conduits having regulated air pressure in this mode are indicated by x's along such conduits.

When the pedal 32 is depressed, the valve 33 opens and provides regulated air pressure in conduit 19. Regulated air pressure flows from the valve 33 to the check valve 40 where it is blocked and to the servo motor which controls the guide vanes 35. When the foot pedal 32 is released, the valve 33 closes its inlet port and opens its outlet port to the atmosphere. The previously regulated air then flows out of the system through valve 33. Thus the position of guide vanes 35 in the transmission is controlled to adjust the torque output of the hydrodynamic transmission.

The idle relay valve 30 moves to the low speed or idle position when the solenoid 30a on the idle speed relay valve 30 is activated. This opens a port and air from inside the valve 30 causes the spool to move against spring tension, to its other position. The system air pressure is stopped from flowing through the idle speed relay valve 30. This also opens the port so the outlet port of the idle speed relay valve is open to atmosphere. Air then flows from the slave cylinder 44, check valve 38, and maximum speed reduction valve 28 out to the atmosphere. The engine then runs at idle speed.

Referring to FIG. 5 the various conduits and devices which are active in this forward mode of the transmission system 10 are indicated in the same manner in FIG. 5 as in FIG. 4. The conduits having small circles along them are pressurized at supply pressure. Those indicated by x's along them are pressurized at a regulated reduced pressure.

FIG. 6 of the drawing shows the control system 10 in the reverse mode after the operator has moved the directional control valve 18 from one extreme to the other to stop the movement of the vehicle in the forward direction and to cause it to move in the reverse direction. In this mode the system air pressure from compressor 13 enters the control system 10 and flows to the speed limiter governor 34, overspeed governor 36 and overspeed converter valve 14. The spool in the overspeed converter valve 14 is held in position by spring tension. When the spool is in this position, air flows through the overspeed converter valve 14 to the range selector valve 16. The spool in the range selector valve is held in the reverse work position by spring tension. Air flows through the valve 14 to the directional selector valve 18 and also out a port of the valve 16 to conduit 17. This latter air moves and holds the spools in the converter fill valve 28 and the guide vane angle valve 24. When the control member 91 is in the "Reverse" position as illustrated in FIG. 6, the selector switch 91,91b activates a solenoid 18b in the directional selector valve. This opens a port and air from inside the directional selector valve 18 moves its spool to the reverse position. Air flows out the reverse port through conduit 15 to the guide vane angle relay valve 24 where it is blocked. Air from the reverse port of the directional selector valve 18 also flows to the check valve 42. This air pressure moves the shuttle in the check valve 42 and thus flows through the check valve. Air from the check valve flows to the reverse hydraulic control valve 133 on the transmission, and moves the valve 133 to the reverse position as illustrated in FIG. 6.

When the pedal 32 is depressed, the valve 33 opens. See FIG. 4. System air pressure is changed to regulated air pressure in the valve 33. Regulated air pressure flows from the valve 33 to the check valve 40 where it is blocked and to the vane angle valve 24. The spool in the valve 24 is held in position by system air pressure from the conduit 17. Regulated air pressure from conduit 19 is transmitted through the valve 24 to the drawbar reduction valve 26. This air flows to the guide vanes 35 of the transmission. When the accelerator pedal 32 is released, the valve 33 closes the inlet port and opens the outlet port to vent. The regulated air then flows out of the system through the valve 33.

In the prior art of FIGS. 4, 5 and 6 the drive apparatus can be reversed by the operator merely moving valve 18 between one of its operative positions and the other by operating switch lever 91. If the move is from forward to reverse the forward converter will drain and the reverse converter will fill and as a consequence the vehicle being operated by the drive apparatus will reverse its direction. This reversal occurs with the engine continuing to run at the normal operating speed. The present invention is an improvement on the prior art whereby when the drive apparatus is reversed by the operator the engine speed drops to idle and the control system goes into the opposite mode whereby a variable orifice valve 107 (see FIG. 1) which is operated by the foot pedal 106, enables the operator to control the filling of the reverse converter by the extent to which and the time during which the operator depresses the foot pedal 106. Valve 107 is referred to herein as a retarder valve because it enables the operator by varying the orifice of valve 107 by the position of foot pedal 106 to produce a controlled retarding or slowing action to the vehicle instead of the uncontrolled reversal of the prior art.

Figure 1:
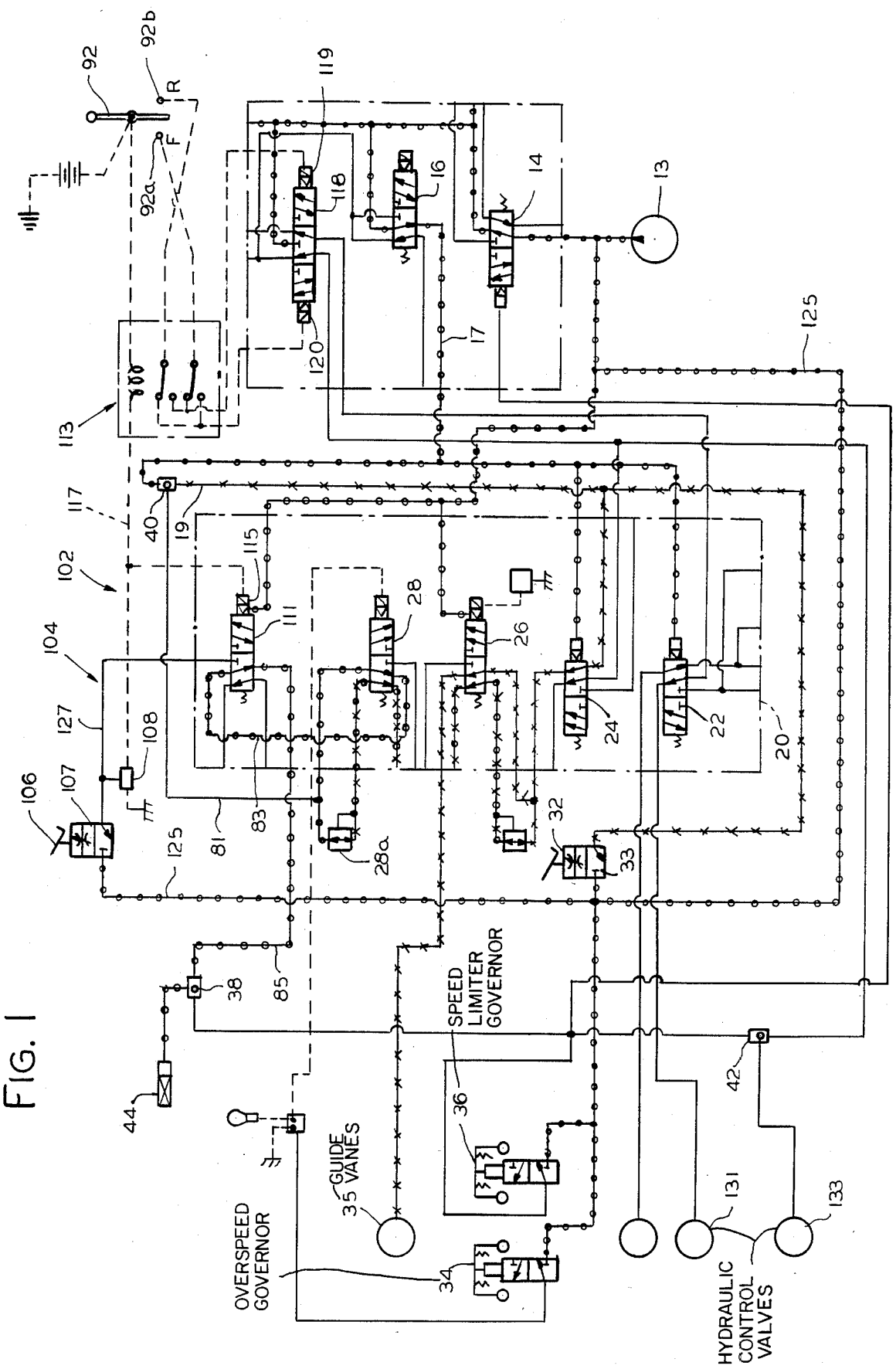
FIG. 1 is a schematic diagram of the control system of this invention with the hydrodynamic transmission in a neutral mode.

Referring to FIG. 1 of the drawing, there is illustrated in this figure a control system 102 which, at the option of the operator during reversing operation causes the engine speed to go to idle and a retarder action to come in to play to permit the operator by operation of the foot pedal 106 to control the manner in which the vehicle is reversed.

To accomplish such operation according to the present invention a subsystem 104 has been included in the control system 102. Such subsystem comprises retarder pedal 106, variable orifice valve 107, a retarder switch 108, and a retarder relay 113, which is associated with the operator's manual selection lever 92. This selector switch corresponds with selector switch 91 in the illustrated prior art but has been assigned a new number because of the differences between them. FIG. 1 of the drawing shows this invention in a neutral mode comparable to FIG. 4 of the prior art.

Figure 2:
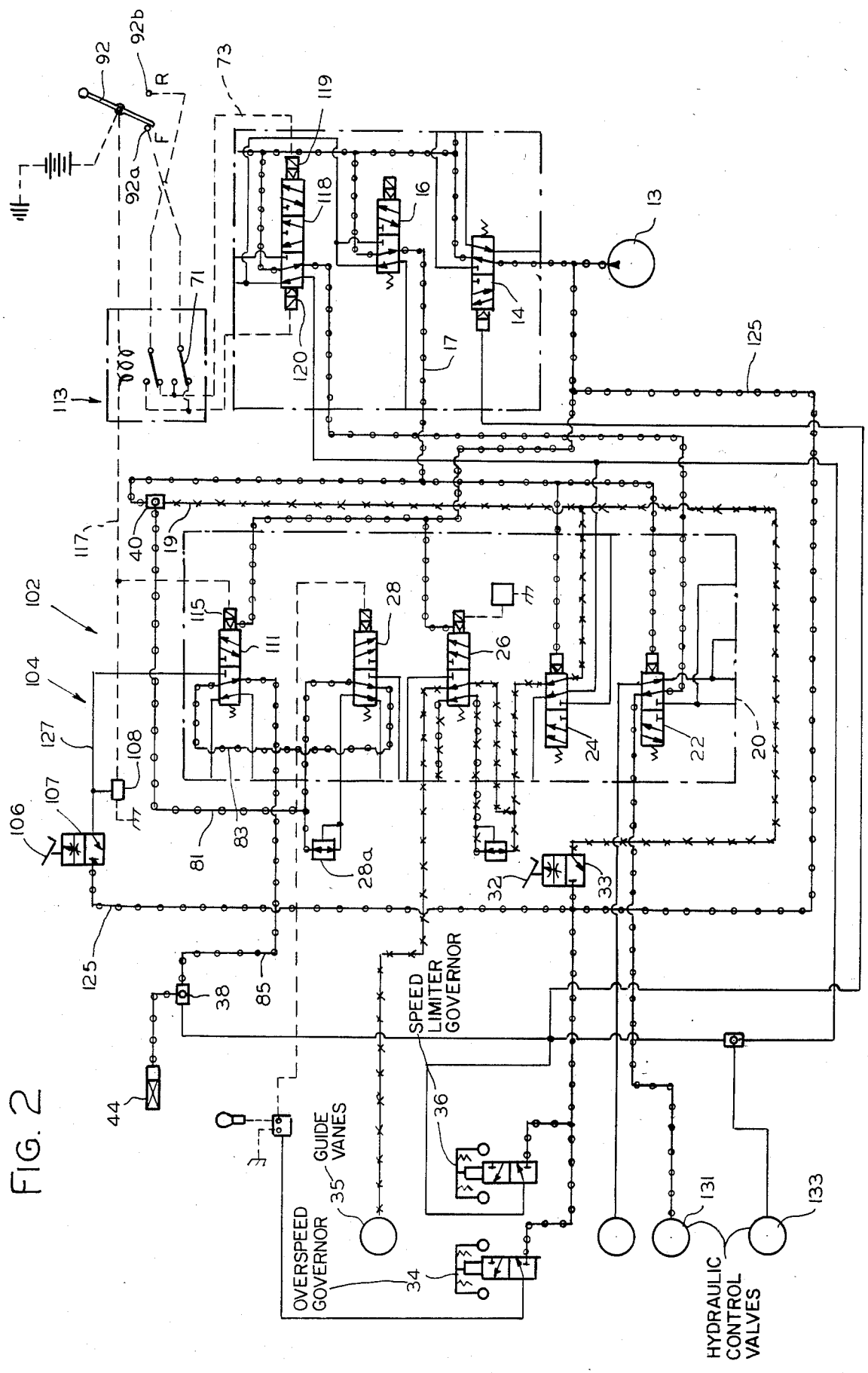
FIG. 2 shows the same control system with the transmission in a forward mode.

FIG. 2 of the drawing shows the reversible drive apparatus of this invention in a forward mode corresponding to FIG. 5 of the prior art. This is a normal operating condition for a vehicle which is equipped as a front end loader, for example. Such loaders have a boom and bucket mounted at one end. They move forwardly with the bucket down to load the bucket and then move rearwardly to maneuver and discharge the material from the bucket into a truck, for example. This means, of course, that the vehicle operates in reverse about as much as it does in forward. The present invention provides that the operator can control the reversing operation by limiting the output torque of the transmission. In the prior art such reversal occurred at a predetermined non-varying output torque. It will be understood that vehicles of the type mentioned operate frequently on uneven and unlevel ground and in other conditions where it is advantageous for the operator to be able accurately to control the reversal, and the present invention provides for such control at the option of the operator.

Figure 3:
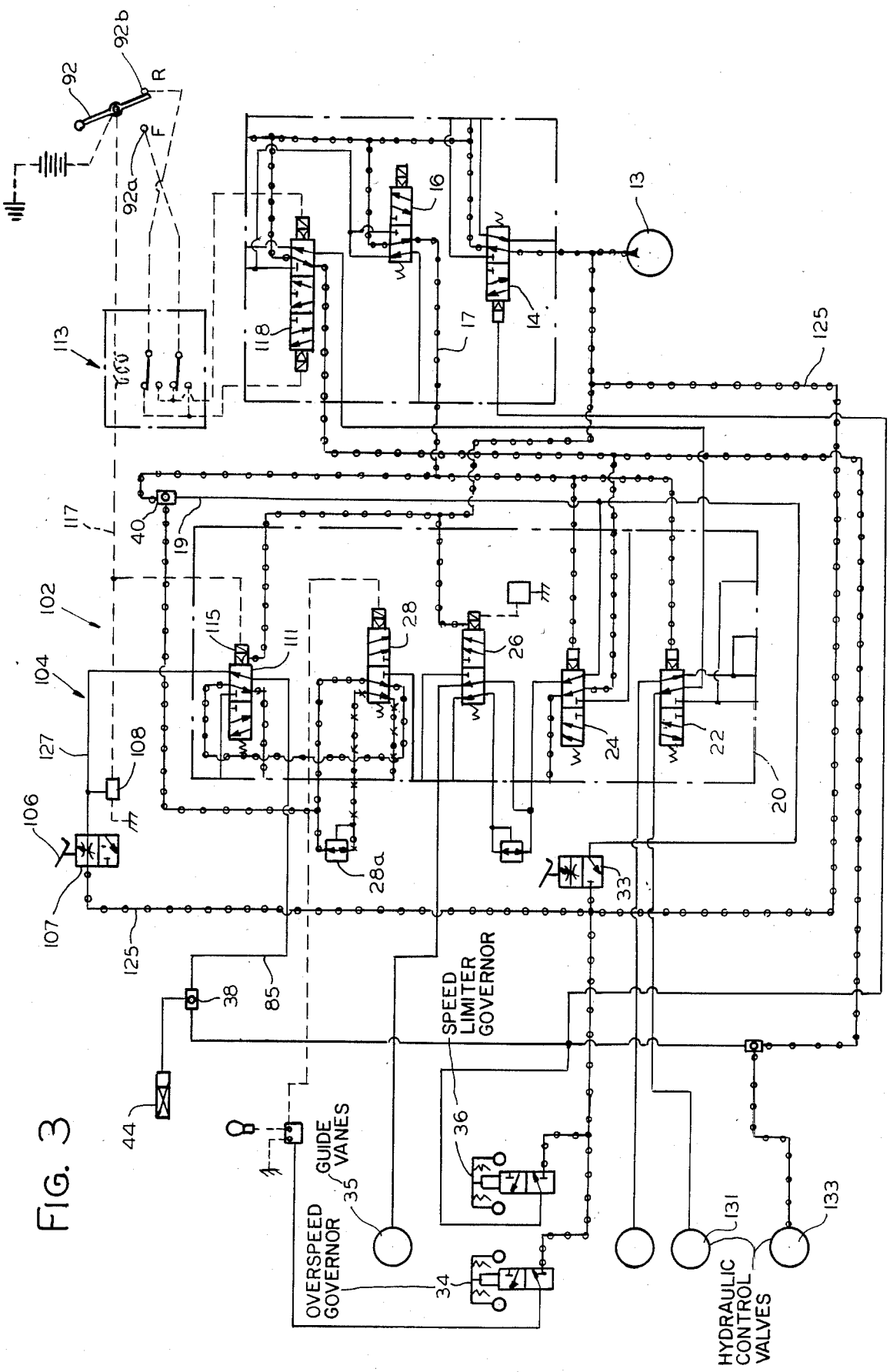
FIG. 3 shows the same control system in a reverse mode.

If the vehicle is operating in the forward mode the control system 102 is as illustrated in FIG. 2 of the drawing. To reverse the drive apparatus the operator need only to depress retarder pedal 106. This, by pressurizing conduit 127, from compressor 13 through conduit 125, operates a pressure switch 108. The closure of switch 108 in turn moves valve 118 from the forward position shown in FIG. 2 to the reverse position; this occurs because the solenoid 119 at the right end of valve 118 is operated from an electrical circuit which includes, from switch 108, conductor 117, relay 113, switch 92,92a, switch 71 of relay 113, conductor 73 and solenoid 119. This moves the valve 118 to the opposite extreme position, as is illustrated in FIG. 3. The valve 118 remains in the latter position until the pedal 106 is released and switch 108 opens. At the same time that the retarder switch 108 operates valve 118 it also operates a solenoid 115 on a valve 111 which moves the valve 111 from the position of FIG. 2 to a position the same as that of FIG. 3.

It will be understood that in the forward operating mode illustrated in FIG. 2 the engine throttle is at the normal engine operating speed position. This occurs because of a supply of compressed air from reservoir 13 through valves 14 and 16, conduit 17, check valve 40, conduit 81, regulator valve 28a and valve 28, conduit 83, valve 111 and conduit 85 to check valve 38 and slave cylinder 44. When the pedal 106 is operated to reverse the drive apparatus and valve 111 is moved the slave cylinder 44, which is spring loaded, moves to the engine idle speed condition. When the valve 111 has moved to the other position compressed air to resupply the slave cylinder 44 is directed from valve 107 through conduit 127, valve 111, conduit 85, and check valve 38; the amount of compressed air thus supplied depends on the speed and amount of opening valve 107, and thus the operator by the movement of pedal 106 controls the reversal of the drive apparatus with a retarding action.

When the reversing operation has been completed and the operator releases pedal 106 the control system 102 automatically shifts the drive apparatus back from the reverse mode to the forward mode of FIG. 2 and the drive apparatus reverses again so that the vehicle resumes its initial forward movement. If the operator does not release pedal 106 the vehicle will continue to move in the reverse direction until he does release the pedal.

It will be appreciated that system 102 also provides for uncontrolled reversal the same as the prior art by manual operation of the switch lever 92 to operate valve 118.

A normal engine speed is referred to in this description and this may be for example 2000 rpm in a front end loader utilizing the present invention; such speed is the normal governed speed of the engine. The idling or low engine speed referred to herein is the normal idling speed of the engine which may be for example 750 rpm.

While I have illustrated and described herein the best mode contemplated for carrying out my invention it will be appreciated that modifications may be made. For example, a hydraulic control system can be substituted for the pneumatic system disclosed herein. Accordingly it should be understood that I intend to cover by the appended claims all such modifications which fall within the true spirit and scope of my invention.

I claim:

1. A control system for a reversible drive apparatus which includes an engine and a transmission having a forward hydraulic torque converter, a reverse hydraulic torque converter and means for selectively filling one of the torque converters with hydraulic fluid to provide operation of the drive apparatus in the desired direction, means for operating the engine at a selected operating speed, and means for selectively reversing the drive apparatus from one mode to the other mode including an operator control member, comprising means responsive to movement of said operator control member which upon initial movement thereof causes the engine speed to drop to idling and upon further movement thereof causes the engine speed to increase and the previously inactive torque converter to fill at a rate responsive to the movement of said operator control member.

2. A control system as in claim 1 wherein said control system comprises means which continue to operate said apparatus in said other mode until said operator control member is returned to its initial condition whereupon said drive apparatus again reverses and returns said apparatus to its initial mode.

3. A control system as in claim 1 wherein said operator control member comprises a foot pedal.

4. A control system as in claim 3 wherein said operator control member is connected to a variable orifice valve.

5. A control system as in claim 1 wherein said engine includes a throttle operator and said initial movement of said operator control member causes said throttle operator to move to the engine idling condition and said engine to drop to idling speed.

6. A control system as in claim 4 including means whereby further movement of said operator control member causes the engine speed to increase and the previously inactive torque converter to fill at a rate responsive to the extent of movement of said operator control member.

7. A control system as in claim 5 including means whereby further movement of said operator control member causes the engine speed to increase and the previously inactive torque converter to fill at a rate responsive to the speed of movement of said operator control member.

8. A control system as in claim 7 including means whereby after said previously inactive torque converter is filled and is operating said drive apparatus in the other mode said other mode continues until the operator releases said operator control member.

9. A control system as in claim 5 including means whereby further movement of said operator control member causes the engine speed to increase and the previously inactive torque converter to fill at a rate responsive to the speed and extent of movement of said operator control member.

10. A control system as in claim 7 including means whereby when said previously inactive torque converter has filled and the engine speed has returned to said operating speed, said drive apparatus automatically reverses again with the engine maintaining said operating speed, whereby said retarder control carries out a complete cycle and said reversible drive apparatus returns to its forward mode.

11. A control system as in claim 1 wherein alternate means selected by the operator are provided for reversing the drive apparatus while the engine continues at said selected operating speed.

12. A control system for a reversible drive apparatus which includes an engine and a transmission having a forward hydraulic torque converter, a reverse hydraulic torque converter and means for selectively filling one of the torque converters with hydraulic fluid to provide operation of the drive apparatus in the desired direction, means for operating the engine at a selected operating speed, and means for selectively reversing the drive apparatus from one mode to the other mode including an operator control member, comprising
   a subsystem which comprises a pneumatic valve having two positions,
   said two positions including an off position and an on position which embodies a variable orifice,
   a solenoid operated two position pneumatic throttle control valve having a throttle-on position and a throttle-off position,
   an electrical pressure switch responsive to the depressing of said operator control member for moving said throttle control valve to said throttle-off position, and
   compressed air supply means through said variable orifice valve for gradually restoring said throttle control and said throttle to said throttle-open position.

13. A control system as in claim 12 wherein said two position pneumatic valve is supplied with pressurized air,
   said pressure switch having an electrical connection to said on-off valve, and
   said on-off valve being reversed each time said operator control member is depressed.

14. A control system as in claim 13 wherein said electrical connection includes an electrical relay.

15. A control system as in claim 14 wherein a manually operated forward-reverse switch is interconnected with said relay to provide alternate manual reversal of said reversible drive apparatus.

* * * * *